(12) United States Patent
Isokangas

(10) Patent No.: US 8,023,456 B2
(45) Date of Patent: Sep. 20, 2011

(54) CONNECTION RESERVATION IN A COMMUNICATION INTERFACE

(75) Inventor: Jari Isokangas, Tampere (FI)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 11/054,434

(22) Filed: Feb. 10, 2005

(65) Prior Publication Data
US 2006/0140133 A1 Jun. 29, 2006

(30) Foreign Application Priority Data
Dec. 27, 2004 (FI) .................................. 20041672

(51) Int. Cl.
G01R 31/08 (2006.01)
H04B 7/212 (2006.01)
H04W 4/00 (2009.01)

(52) U.S. Cl. ........ 370/329; 370/252; 370/322; 370/341; 370/348; 370/443

(58) Field of Classification Search .................. 370/252, 370/254, 401, 389, 468
See application file for complete search history.

(56) References Cited

U.S. PATENT DOCUMENTS

| | | | |
|---|---|---|---|
| 6,173,162 B1 * | 1/2001 | Dahlman et al. | 455/69 |
| 6,374,112 B1 * | 4/2002 | Widegren et al. | 455/452.2 |
| 6,704,291 B2 * | 3/2004 | Mueckenheim et al. | 370/252 |
| 6,996,401 B2 * | 2/2006 | Agin | 455/453 |
| 7,173,907 B1 * | 2/2007 | Weber et al. | 370/230 |
| 7,230,948 B2 * | 6/2007 | Agnevik et al. | 370/395.6 |
| 2002/0105969 A1 * | 8/2002 | Benedyk et al. | 370/466 |
| 2003/0152060 A1 * | 8/2003 | Danneel et al. | 370/342 |
| 2004/0132453 A1 | 7/2004 | Gabriel et al. | 455/466 |

OTHER PUBLICATIONS

Hiroshi Saito, Senior Member (IEEE), "Bandwidth Management for AAL2 Traffic", 2000, pp. 1364-1377.

Ana-Belen Garcia, et al., (Dept. of Telematics—Technical University of Madrid—EIT-UPM, ATM Transport Between UMTS Base Stations and Controllers: Supporting Topology and Dimensioning Decisions, 2004, pp. 2176-2180.

* cited by examiner

Primary Examiner — Daniel J Ryman
Assistant Examiner — Thinh D Tran
(74) Attorney, Agent, or Firm — Squire, Sanders & Dempsey (US) LLP

(57) ABSTRACT

A method distributes transport bearer capacity in a communication system. The method comprises defining a total need for transport capacity for a set of transport bearers sharing a physical channel. The method also comprises reserving transport bearer capacity from the physical channel based on total need. The method also comprises distributing transport bearer capacity to at least one individual transport bearer of the set of transport bearers from the transport bearer capacity reserved from the physical channel Furthermore, a network entity for a communication system and a communication system are configured to execute the method.

10 Claims, 2 Drawing Sheets

CONNECTION RESERVATION IN A COMMUNICATION INTERFACE

FIELD OF THE INVENTION

The invention relates to communication systems, and, in particular, to connection reservation in a communication interface.

BACKGROUND OF THE INVENTION

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or otherwise mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN).

A geographical area covered by a radio access network is divided into cells defining a radio coverage provided by a transceiver network element, such as a Node B. A single transceiver network element may serve a number of cells. A plurality of transceiver network elements is typically connected to a controller network element, such as a radio network controller (RNC). The logical interface between an RNC and a Node B, as defined by the third generation partnership project (3GPP), is called as an Iub interface.

Physical channels are transmission channels, such as radio channels, provided between transmitters and receivers. A transport channel defines characteristics, such as coding, interleaving and mapping onto physical channels, with which data is transported over the air interface. A logical channel is an information stream for a particular type of information carried by a transport channel. Wideband code division multiple access (WCDMA) is an example of a channel multiplexing technique for mapping transport channels onto physical channels in a 3GPP network.

In different communication systems, different transfer modes may be used. Examples of transfer modes may comprise circuit mode, packet mode, frame mode and cell mode. The circuit mode is used, for example, in the PSTN and the GSM. The packet mode is used, for example, in the IP networks and in the GPRS. The frame mode may be used, for example, to interconnect local are networks (LANs). The cell mode comprises, for example, Asynchronous Transfer Mode (ATM).

Asynchronous Transfer Mode (ATM) is a cell-based technique for multiplexing and transfer of information used, for example, in the UTRAN. In the ATM, an information flow with different and varying bit rates, comprising different services, such as voice, data and video, is organised into one common cell flow. ATM uses fixed-length cells of 53 bytes having a cell header of five octets and a user part, also called payload, of 48 octets. ATM creates fixed logical channels between two points when data transfer begins. The logical channels are identified by an address in the cell header. The address is divided into two levels, virtual channels (VC) and virtual paths (VP). The header thus includes a virtual channel identifier (VCI) and a virtual path identifier (VPI) identifying a connection in the ATM network. A virtual path is a path between two network nodes and a virtual channel is a route for a specific connection on the virtual path. The physical transmission medium, such as an optical fibre, carries several virtual paths.

In the ATM, a protocol reference model defines layers of the ATM. The lowest layer is a physical layer transporting the ATM cells created in a layer above, in an ATM layer. Above the ATM layer, an ATM adaptation layer (AAL) maps bit streams from higher layers onto the ATM layer. The AAL comprises different protocols, namely AAL0, AAL1, AAL2, AAL3/4 and AAL5, for example, for supporting different service classes. The purpose of the AAL2, i.e. the ATM adaptation layer type 2, is to realise connections of variable bit rate on a common AAL2 virtual path. The AAL2 establishes an ATM virtual channel connection (VCC).

In the 3GPP WCDMA UTRAN, ATM switching may be used. For example, downlink Common Transport Channels, such as a Forward Access Channel (FACH) and a Paging Channel (PCH), each typically have a separate transport bearer, that is, a dedicated AAL2 connection over the Iub interface. In other words, for example relating to the FACH, one Iub FACH data stream is carried on one transport bearer and for each FACH in a cell, a transport bearer must be established over the Iub interface, as defined in the 3GPP TS 25.430 V3.6.0 (2001-06), Third Generation Partnership Project; Technical Specification Group Radio Access Network; UTRAN Iub Interface: General Aspect and Principles (Release 1999), paragraph 4.5.1.

For a reliable transport for each common transport channel over the Iub interface, an AAL2 connection for each common transport channel is usually reserved based on the maximum bit rate of the channel. However, the common transport channels can use a single control channel, such as a Secondary Common Control Physical Channel (SCCPCH), over the air interface depending on the physical channel configuration used. Thus, the common channels cannot all send using the maximum bit rate configured for each channel in a single time interval (TTI). Scheduling, or admission control, of the SCCPCH may be managed by a medium access control-common/shared channel (MAC-C/SH) entity in an RNC, ensuring that the amount of traffic send by the RNC to a transceiver network element does not exceed the capacity of the control channel the common channels in question are using. If an AAL2 connection is reserved for all the common channels based on the configured maximum bit rate, some of the transport capacity may be unnecessarily reserved. This may lead to inefficient usage of available transport resources over the Iub interface.

Similar situation may arise, for example, when a Downlink Shared Channel (DSCH) concept is used. Each transport bearer is provided by a separate AAL2 connection over the Iub interface. A MAC-C/SH handles the scheduling and ensures that the capacity of a Physical Downlink Shared Channel (PDSCH) is not exceeded. However, each of the user data streams carried over the separate AAL2 connections can use momentarily the whole capacity of the PDSCH. Thus, the AAL2 connections over the Iub interface need to be reserved based on the maximum bit rate of an individual user data stream. This again may lead to inefficient usage of transport resources over the Iub.

For other channels, similar conditions may apply. In accordance with 3GPP TS 25.434 V6.1.0 (2004-03), Third Generation Partnership Project; Technical Specification Group Radio Access Network; UTRAN Iub Interface Data Transport and Transport Signalling for Common Transport Channel Data Streams (Release 6), paragraph 5.2, ATM and AAL2 may be used at the standard transport layer for Iub Random Access Channel (RACH), Common Packet Channel (CPCH), FACH, PCH, DSCH, High Speed Downlink Shared Channel (HS-DSCH) and Uplink Shared Channel (USCH) data streams.

It shall be appreciated that these issues are not limited to any particular communication environment, but similar issues may occur in other communication systems as well.

Patent Application US 2002/0181470 A1 proposes a solution for bandwidth efficient quality of service separation of AAL2 traffic. In the US 2002/0181470 A1, bandwidth of an individual AAL2 path comprising an AAL2 path group is contributed to a total bandwidth of the AAL2 path group rather than to the individual AAL2 path exclusively. An admission decision regarding a connection seeking to use an AAL2 path belonging to the AAL2 path group is based on available bandwidth of the AAL2 path group rather than available bandwidth of an individual AAL2 path. ATM VCCs, which comprise the AAL2 path group, are transported on a virtual path together with ATM VCCs of a different type.

It might be desired to be able to reserve AAL2 capacity in the Iub based on a real usage of AAL2 resources in the Iub. This might help to avoid unnecessary reservations of transport resources. This might increase efficiency of a use of transport resources in the Iub interface.

SUMMARY OF THE INVENTION

Embodiments of the invention aim to address one or several of the above problems or issues.

In accordance with an aspect of the invention, there is provided a method for distributing transport bearer capacity in a communication system. The method comprises defining a total need for transport capacity for a set of transport bearers sharing a physical channel. The method further comprises reserving transport bearer capacity from the physical channel based on said total need. The method further comprises distributing transport bearer capacity to at least one individual transport bearer of the set of transport bearers from the transport bearer capacity reserved from the physical channel.

In accordance with another aspect of the invention, there is provided a network element for a communication system. The network element is configured to define a total need for transport capacity for a set of transport bearers sharing a physical channel. The network element is further configured to reserve transport bearer capacity from the physical channel based on said total need. The network element is further configured to distribute transport bearer capacity to at least one individual transport bearer of the set of transport bearers from the transport bearer capacity reserved from the physical channel.

In accordance with another aspect of the invention, there is provided a network element for a communication system. The network element comprises defining means for defining a total need for transport capacity for a set of transport bearers sharing a physical channel. The network element further comprises reserving means for reserving transport bearer capacity from the physical channel based on said total need. The network element further comprises distributing means for distributing transport bearer capacity to at least one individual transport bearer of the set of transport bearers from the transport bearer capacity reserved from the physical channel.

In accordance with another aspect of the invention, there is provided a communication system. The communication system is configured to define a total need for transport capacity for a set of transport bearers sharing a physical channel. The communication system is further configured to reserve transport bearer capacity from the physical channel based on said total need. The communication system is further configured to distribute transport bearer capacity to at least one individual transport bearer of the set of transport bearers from the transport bearer capacity reserved from the physical channel.

In accordance with another aspect of the invention, there is provided a communication system. The communication system comprises defining means for defining a total need for transport capacity for a set of transport bearers sharing a physical channel. The communication system further comprises reserving means for reserving transport bearer capacity from the physical channel based on said total need. The communication system further comprises distributing means for distributing transport bearer capacity to at least one individual transport bearer of the set of transport bearers from the transport bearer capacity reserved from the physical channel.

In an embodiment, the total need may be defined as a sum of transport capacities potentially used simultaneously by the transport bearers sharing the physical channel.

In an embodiment, the total need may be defined as a sum of a transport capacity of a transport bearer having the highest bit rate among the set of transport bearers and a transport capacity needed for frame protocol control frames of the other transport bearers of the set.

In an embodiment, a dedicated connection may be established for reserving said transport bearer capacity from the physical channel.

In an embodiment, a total need may be defined for an asynchronous transfer mode adaptation layer 2 capacity for a set of common transport channels sharing a physical channel over an Iub interface between a controller network element and at least one transceiver network element.

BRIEF DESCRIPTION OF FIGURES

The invention will now be described in further detail, by way of example only, with reference to the following examples and accompanying drawings, in which.

DETAILED DESCRIPTION OF THE PREFERRED EMBODIMENTS

Figure 1:
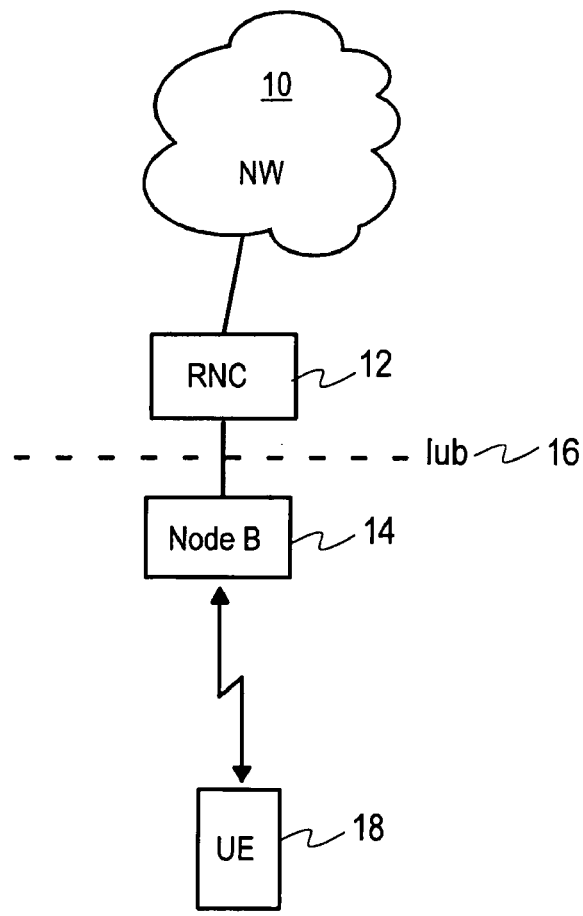
FIG. 1 shows an exemplifying architecture of a system in which the embodiments of the invention may be implemented.

FIG. 1 shows an exemplifying architecture of a system in which the embodiments of the invention may be implemented. A communication network 10 may be accessed via a radio access network (RAN) comprising a controller network element, such as a radio network controller (RNC) 12, and one or more transceiver network elements, such as a Node B 14, controlled by the RNC 12. The Iub interface 16 is shown between the RNC 12 and the Node B 14. The Iub interface uses AAL2 connections as transport bearers for providing transport channels. In an embodiment, the RAN may be provided by the UTRAN. In an embodiment, the communication network 10 may be provided at least in part by a third generation network, such as the UMTS.

It shall be appreciated that FIG. 1 is only an example of a simplified communication system using at least in part ATM switching. The number, type and order of the entities may differ substantially from the shown. It shall also be appreciated that the terms used in the context of FIG. 1 refer to the 3G mobile communication systems as defined by the 3GPP. In the second generation (2G) mobile communication systems, such as the GSM, the transceiver network element is typically called a base transceiver station (BTS) or simply base station and a controller network element is typically called a base station controller (BSC).

Figure 2:
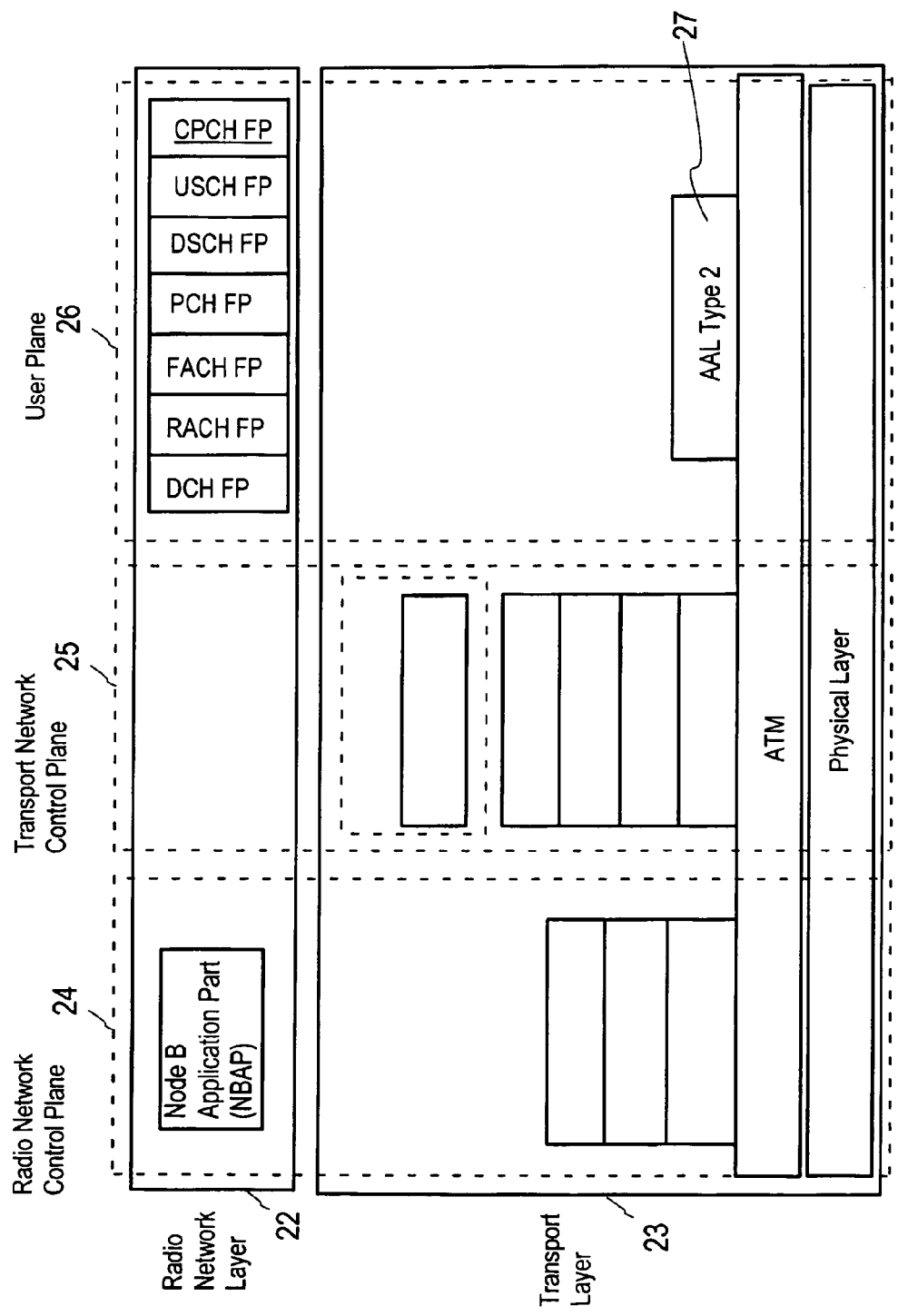
FIG. 2 shows the Iub interface protocol structure.

FIG. 2 shows the Iub interface protocol structure as defined in 3GPP TS 25.430 V3.6.0 (2001-06), paragraph 7. Only the parts of the Iub interface protocol structure needed to understand the invention are shown in FIG. 2. As shown in FIG. 2, the Iub protocol architecture consists of a radio network layer 22 and a transport layer 23. The radio network layer 22 defines procedures related to the operation of Node B and consists of a radio network control plane 24 and a user plane 26. The transport layer 23 defines procedures for establishing physical connections between Node B and the RNC. The transport layer 23 consists of the radio network control plane 24, a transport network control plane 25 and the user plane 26. As defined in 3GPP TS 25.430 V3.6.0 (2001-06), paragraph 7, there shall be one dedicated AAL2 connection 27 for each RACH (Random Access Channel), one for each FACH (Forward Access Channel) transport channel, and one for each CPCH (Common Packet Channel).

Common transport channel data streams in the UTRAN Iub interface are further defined in 3GPP TS 25.434 V6.1.0 (2004-03).

Embodiments of the invention define schemes for reserving transport bearer capacity in physical channels shared by several transport bearers. It has now been found that the transport bearer capacity may be reserved in a physical channel based on a total need of all the transport bearers sharing the physical channel for transport capacity. The total need may be defined as a sum of transport capacities potentially used simultaneously by the transport bearers sharing the physical channel for transport capacity.

Figure 3:
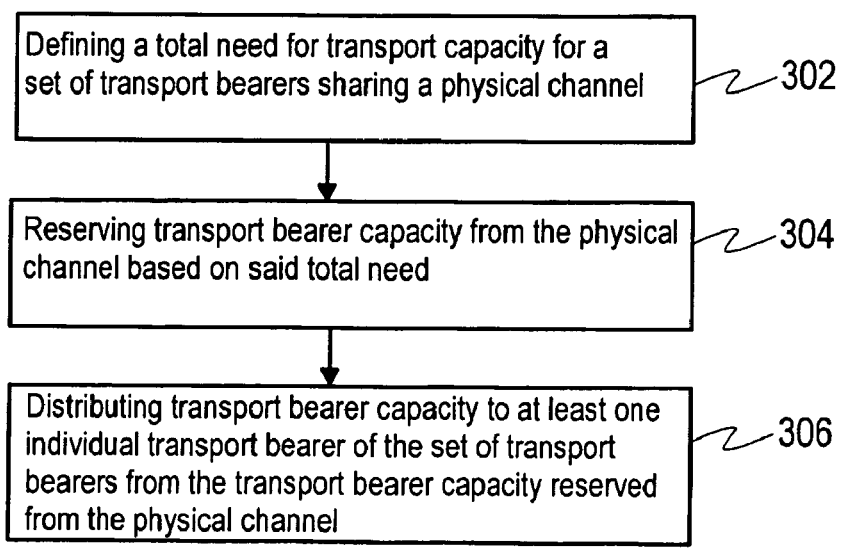
FIG. 3 shows a flow chart illustrating an embodiment of the invention.

FIG. 3 shows a flow chart illustrating an embodiment of the invention. In step 302, a total need for transport capacity for a set of transport bearers sharing a physical channel is defined. In step 304, transport bearer capacity is reserved from the physical channel based on said total need. In step 306, transport bearer capacity is distributed to at least one individual transport bearer of the set of transport bearers from the transport bearer capacity reserved from the physical channel.

In an embodiment, AAL2 capacity from a virtual channel connection (VCC) of an Iub interface is reserved based on a capacity of physical channels (such as the SCCPCH or PDSCH) shared by several AAL2 connections. Said total need may be defined for an AAL2 capacity for a set of common transport channels sharing a physical channel over the Iub interface between a controller network element and at least one transceiver network element.

In an embodiment, a first transport bearer, such as a first AAL2, may be reserved for a transport channel having the highest bit rate. The highest bit rate may be as high as the total capacity of the physical channel, which is to be shared. For the other transport channel(s) sharing the same physical channel, transport bearer reservation may be done based on a need of Frame Protocol (FP) control frames. The FP control frames transmit information on protocols used in a connection, power management information and other control information. The FP control frames may need to be transmitted between a controller network element and a transceiver network element even if the actual transport bearer is inactive, that is, the actual transport bearer is not scheduled. In this embodiment, said total need may thus be defined as a sum of a transport capacity of a transport bearer having the highest bit rate among the set of transport bearers and a transport capacity needed for frame protocol control frames of the other transport bearers of the set.

In a further embodiment, first a dedicated connection, or a so-called pseudo AAL2 connection, may be established to reserve transport resources from the physical channel. The pseudo AAL2 connection may be established based on a maximum transport capacity of the physical channel. The pseudo AAL2 connection may thus reserve all of the maximum transport capacity of the physical channel. In an alternative, only a part of the maximum transport capacity of the physical channel is reserved for the pseudo AAL2 connection. In an embodiment, the pseudo AAL2 connection may be established when a first actual user data stream is established. If the first actual user data stream does not use all of the transmission resources reserved for the pseudo AAL2 connection, the subsequent user data streams may then use the transport capacity remaining in the pseudo AAL2 connection.

It shall be appreciated that, especially with regard to common channels, it may be sufficient to ensure that total amount of reserved AAL2 capacity matches with reserved physical capacity. The pseudo connection may be applicable, in particular, for DSCH type of channels, where physical reservation can exist without an actual transport bearer.

A further embodiment uses the High Speed Downlink Shared Channel (HS-DSCH) with High Speed Downlink Packet Access (HSDPA). In this embodiment, scheduling and admission control for transport bearer towards the transceiver network element is centralised in the RNC site. Thus, it can be ensured that the sum of separate AAL2 connections (MAC-d flows) does not continuously exceed the reserved AAL2 capacity. Exceeding the sum of separate AAL2 connections would jeopardise the quality of service (QoS) of other transport bearers using the same transport resources.

With embodiments of the invention, AAL2 capacity for the Iub may be reserved based on the real usage of AAL2 resources in the Iub. Unnecessary reservations of transport resources may be avoided and the efficiency of transport resource usage in the Iub interface may be increased.

Embodiments of the invention may be implemented at least in part by means of a computer program comprising program code means for performing any of the steps according to embodiments of the invention when the program is run on a computing means. The computing means may be comprised in an appropriate network element of the communication system.

Although the invention has been described in the context of particular embodiments, various modifications are possible without departing from the scope and spirit of the invention as defined by the appended claims. For example, the communication system, wherein the invention may be implemented, may be another appropriate communication system in which more than one transport bearers share one physical channel.

The invention claimed is:

1. A method, comprising:
defining a total need for transport capacity for all of a plurality of transport bearers sharing a physical channel, wherein the defining comprises defining the total need as a sum of a transport capacity of a transport bearer having a highest bit rate among the plurality of transport bearers and a transport capacity needed for frame protocol control frames of remaining transport bearers;
reserving transport bearer capacity from the physical channel based on said total need; and
distributing transport bearer capacity to at least one individual transport bearer of the plurality of transport bearers from the transport bearer capacity reserved from the physical channel.

2. The method according to claim 1, wherein the reserving comprises establishing a dedicated connection to reserve said transport bearer capacity from the physical channel.

3. The method according to claim 1, wherein the defining comprises defining the total need for an asynchronous transfer mode adaptation layer 2 capacity for a set of common transport channels sharing the physical channel over an Iub interface between a controller network element and at least one transceiver network element.

4. A non-transitory computer-readable storage medium encoded with instructions configured to control a processor to perform a process, the process comprising:
defining a total need for transport capacity for all of a plurality of transport bearers sharing a physical channel, wherein the defining comprises defining the total need as a sum of a transport capacity of a transport bearer having a highest bit rate among the plurality of transport bearers and a transport capacity needed for frame protocol control frames of remaining transport bearers;
reserving transport bearer capacity from the physical channel based on said total need; and
distributing transport bearer capacity to at least one individual transport bearer of the plurality of transport bearers from the transport bearer capacity reserved from the physical channel.

5. An apparatus, comprising:
a processor; and
a memory including computer program code,
the memory and the computer program code configured to, with the processor, cause the apparatus at least to
define a total need for transport capacity for all of a plurality of transport bearers sharing a physical channel, wherein the defining of the total need by the apparatus comprises defining the total need as a sum of a transport capacity of a transport bearer having a highest bit rate among the plurality of transport bearers and a transport capacity needed for frame protocol control frames of remaining transport bearers,
reserve transport bearer capacity from the physical channel based on said total need, and
distribute transport bearer capacity to at least one individual transport bearer of the plurality of transport bearers from the transport bearer capacity reserved from the physical channel.

6. The apparatus according to claim 5, wherein the memory and the computer program code are further configured to, with the processor, cause the apparatus at least to establish a dedicated connection to reserve said transport bearer capacity from the physical channel.

7. The apparatus according to claim 5, wherein the memory and the computer program code are further configured to, with the processor, cause the apparatus at least to define the total need for an asynchronous transfer mode adaptation layer 2 capacity for a set of common transport channels sharing the physical channel over an Iub interface between a controller network element and at least one transceiver network element.

8. An apparatus, comprising:
defining means for defining a total need for transport capacity for all of a plurality of transport bearers sharing a physical channel, wherein the defining means is configured to define the total need as a sum of a transport capacity of a transport bearer having a highest bit rate among the plurality of transport bearers and a transport capacity needed for frame protocol control frames of remaining transport bearers;
reserving means for reserving transport bearer capacity from the physical channel based on said total need; and
distributing means for distributing transport bearer capacity to at least one individual transport bearer of the plurality of transport bearers from the transport bearer capacity reserved from the physical channel.

9. A system, comprising:
a definer configured to define a total need for transport capacity for all of a plurality of transport bearers sharing a physical channel, wherein the definer is configured to define the total need as a sum of a transport capacity of a transport bearer having a highest bit rate among the plurality of transport bearers and a transport capacity needed for frame protocol control frames of remaining transport bearers;
a reserver configured to reserve transport bearer capacity from the physical channel based on said total need; and
a distributor configured to distribute transport bearer capacity to at least one individual transport bearer of the plurality of transport bearers from the transport bearer capacity reserved from the physical channel,
wherein the definer, reserver and distributor are implemented at least partially in hardware.

10. A system, comprising:
defining means for defining a total need for transport capacity for all of a plurality of transport bearers sharing a physical channel, wherein the defining means is configured to define the total need as a sum of a transport capacity of a transport bearer having a highest bit rate among the plurality of transport bearers and a transport capacity needed for frame protocol control frames of remaining transport bearers;
reserving means for reserving transport bearer capacity from the physical channel based on said total need; and
distributing means for distributing transport bearer capacity to at least one individual transport bearer of the plurality of transport bearers from the transport bearer capacity reserved from the physical channel.

* * * * *